(12) United States Patent
Xia et al.

(10) Patent No.: US 9,560,634 B2
(45) Date of Patent: Jan. 31, 2017

(54) GROUP RESOURCE ALLOCATION METHOD

(71) Applicant: ZTE Corporation, Shenzhen, Guangdong (CN)

(72) Inventors: Wei Xia, Shenzhen (CN); Yanfeng Guan, Shenzhen (CN); Zhaohua Lu, Shenzhen (CN); Dengkui Zhu, Shenzhen (CN); Ying Liu, Shenzhen (CN); Ding Ning, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 48 days.

(21) Appl. No.: 14/261,930

(22) Filed: Apr. 25, 2014

(65) Prior Publication Data

US 2014/0226599 A1 Aug. 14, 2014

Related U.S. Application Data

(62) Division of application No. 13/143,195, filed as application No. PCT/CN2009/074999 on Nov. 17, 2009, now Pat. No. 8,792,435.

(30) Foreign Application Priority Data

Jan. 6, 2009 (CN) .......................... 2009 1 0002372

(51) Int. Cl.
*H04W 72/00* (2009.01)
*H04W 72/04* (2009.01)
*H04W 72/12* (2009.01)

(52) U.S. Cl.
CPC ........... *H04W 72/005* (2013.01); *H04W 72/04* (2013.01); *H04W 72/121* (2013.01)

(58) Field of Classification Search
CPC ... H04W 72/005; H04W 72/04; H04W 72/121
(Continued)

(56) References Cited

U.S. PATENT DOCUMENTS

2006/0264218 A1* 11/2006 Zhang et al. ................. 455/450
2007/0206561 A1    9/2007 Son
(Continued)

FOREIGN PATENT DOCUMENTS

CN          1567787 A     1/2005
CN        101039160 A     9/2007
(Continued)

OTHER PUBLICATIONS

International Search Report in international application No. PCT/CN2009/074999, mailed on Feb. 25, 2010. (2 pages—see entire document).

(Continued)

*Primary Examiner* — Stephen J Clawson
(74) *Attorney, Agent, or Firm* — Oppedahl Patent Law Firm LLC

(57) ABSTRACT

The present invention discloses a group resource allocation method, which comprises the following steps that: a user resource management device groups user-side equipments according to the service type or the modulation and coding scheme of the user-side equipments; and the user resource management device performs an initialization description and/or an update and maintenance description for each group via a group message, describes the resource allocation information of the user-side equipments in each group via the group message to realize a group resource allocation. Through the technical solution above, the present invention lowers the description overhead of a group resource allocation.

11 Claims, 13 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2008/0095071 A1 | 4/2008 | Lu | |
| 2008/0101281 A1* | 5/2008 | Harris | H04L 69/04 370/328 |
| 2008/0228878 A1 | 9/2008 | Wu | |
| 2009/0022098 A1 | 1/2009 | Novak | |
| 2009/0073940 A1* | 3/2009 | Shrivastava et al. | 370/336 |
| 2009/0092066 A1* | 4/2009 | Chindapol | H04W 76/005 370/277 |
| 2010/0008326 A1* | 1/2010 | Albanese | H04W 72/005 370/331 |
| 2010/0177717 A1* | 7/2010 | Sung | H04W 72/042 370/329 |
| 2011/0034197 A1* | 2/2011 | Novak | H04W 72/121 455/509 |
| 2013/0003526 A1 | 1/2013 | Novak | |
| 2013/0010729 A1 | 1/2013 | Novak | |
| 2013/0016603 A1 | 1/2013 | Novak | |
| 2013/0022020 A1 | 1/2013 | Novak | |

FOREIGN PATENT DOCUMENTS

| | | |
|---|---|---|
| CN | 101159975 A | 4/2008 |
| CN | 101170477 A | 4/2008 |
| WO | 2007045101 A2 | 4/2007 |
| WO | 2008110125 A1 | 9/2008 |
| WO | 2008130156 A1 | 10/2008 |

OTHER PUBLICATIONS

English Translation of the Written Opinion of the International Search Authority in international application No. PCT/CN2009/074999, mailed on Feb. 25, 2010. (3 pages—see entire document).
Supplementary European Search Report in European application No. 09837333.5, mailed on May 23, 2016.

* cited by examiner

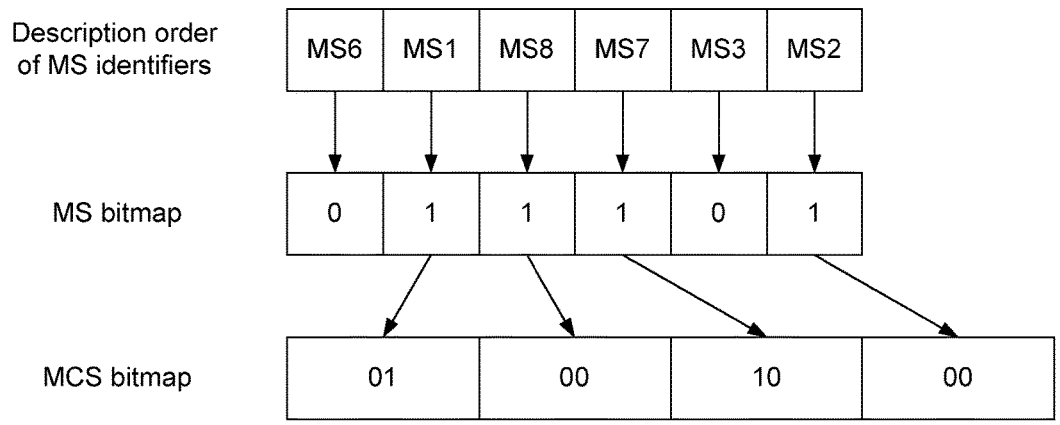
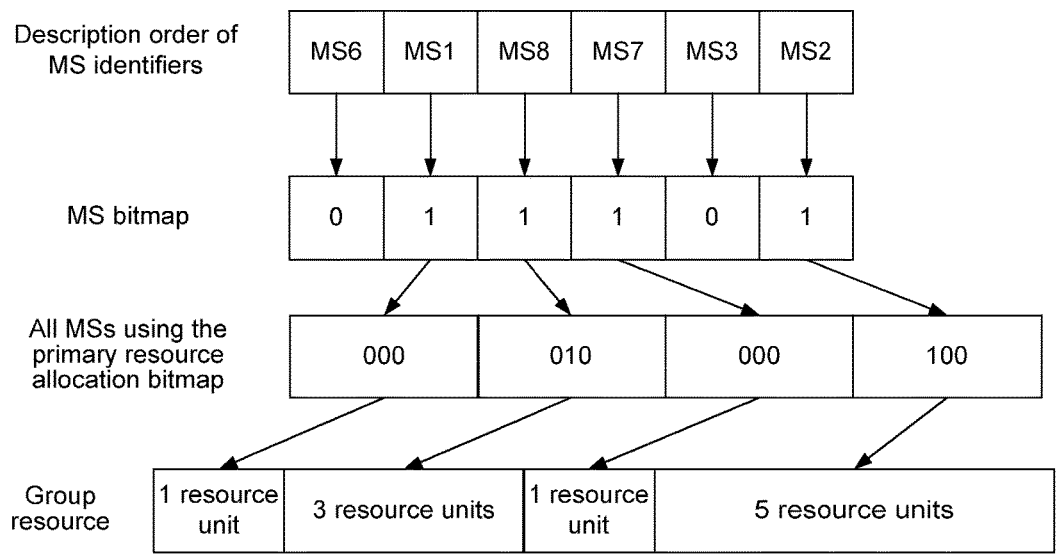

Fig. 11
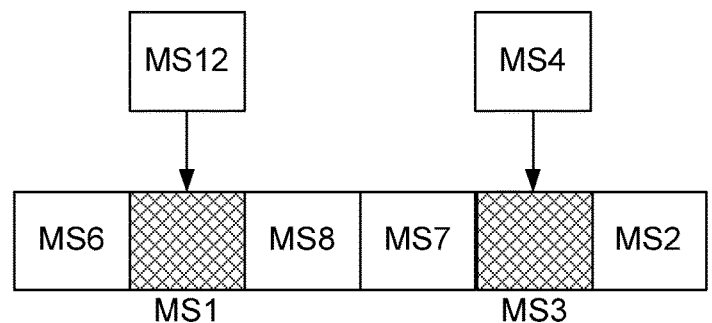
New mobile stations automatically fill the locations of removed mobile stations
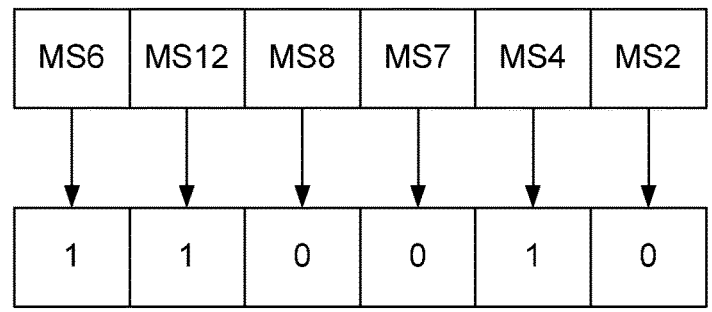
MSs in the group
MS bitmap

GROUP RESOURCE ALLOCATION METHOD

This application is a division of U.S. application Ser. No. 13/143,195 filed Jul. 6, 2011, which application is incorporated herein by reference for all purposes.

TECHNICAL FIELD

The present invention relates to the field of communications, and in particular to a group resource allocation method.

BACKGROUND

At present, with the development of radio communication network technologies, new radio communication systems are capable of supporting more users and providing a higher spectrum efficiency to obtain the maximum system capacity. Some services, such as Voice Over IP (VoIP), Gaming and video conference, are featured with small data packet, high real-time performance and a great number of users. Thus, it is extremely important for such services to utilize system resources fully and effectively to lower the signaling overhead of a minimum resource allocation description.

In the dynamic resource allocation mode of the current institute for electrical and electronic engineers (IEEE) 802.16e system, resources are dynamically allocated for each user, and the identifier of each user and resource information are indicated in a control message during each allocation. This dynamic allocation mode leads easily to a high control message overhead when there are a great number of users. For instance, the control overhead of a VoIP user can account for 40%-50% of the total downlink resources of a system. The permanent allocation method of the IEEE 802.16e system can lower the overhead of the VoIP service, however, the error control mechanism and the hole filling mechanism are relatively complicated, and moreover, the permanent allocation method is only applicable to periodic services with size-fixed resources but not users using services with resources greatly changing in size, such as Gaming.

On this ground, a group-based resource allocation method is proposed in related technologies by which multiple users are divided into one group and the resources of each user group are allocated and managed, and which saves the description overhead of each user identifier during each resource allocation. However, this technical solution limits the size of the data packets of all the users in a group. And additionally, it is needed to divide multiple groups for different kinds of services or different kinds of VoIP service voice coders and coding rates, leading to more limitations to grouping and a higher complexity of management.

Furthermore, the technical solution above takes no consideration of the indication of a resource allocation for a data packet in a silent period. As VoIP service is featured with being switched between a silent period and an active period, a data packet in a silent period is smaller that a data packet in an active period, and correspondingly, the number of the resource units occupied by a data packet in a silent period is smaller than that of the resource units occupied by a data packet in an active period. For instance, a data packet in a silent period occupies a resource unit, and only 1 bit is needed to indicate the size of the used resources, and a data packet in an active period occupies 6 resources units, and 3 bits are needed to indicate the number of the used resource units. Using the same number of bits to indicate the number of the allocated resource units for a user in the active period and a user in the silent period will cause a high overhead. And on the other hand, the technical solution above takes no consideration of an overhead-saving resource allocation and indication method for a user added in a group and a user removed from a group.

SUMMARY

Considering the problems in the related technologies that the grouping for a group resource allocation is subjected to many limitations and high in both complexity and overhead, the present invention is proposed mainly for providing an improved group resource allocation solution to address at least one of the problems above.

In order to achieve the purpose above, the technical solution of the present invention is realized as follows:

a group resource allocation method comprises the following steps that:

a user resource management device groups user-side equipments according to a service type or a Modulation and Coding Scheme of the user-side equipments; and the user resource management device performs an initialization description and/or an update and maintenance description for each group via a group message, describes the resource allocation information of the user-side equipments in each group via the group message to realize a group resource allocation.

The step of grouping user-side equipments by a user resource management device according to a service type of the user-side equipments comprises dividing the user-side equipments of the same service type into one group by the user resource management device, wherein one or more MCSs are involved in the group; and the step of grouping user-side equipments by a user resource management device according to an MCS of the user-side equipments comprises dividing the user-side equipments using the same MCS into one group by the user resource management device, wherein one or more service types are involved in the group.

The group message comprises control information of one or more groups; the control information indicates a number of groups that are being initialized and a number of groups that are being maintained, and describes a group initialization message of the groups that are being initialized and a group maintenance message of the groups that are being maintained; the group initialization message and the group maintenance message correspond to a same message type index and are both sent in a unicast service control channel.

The resource allocation information comprises at least one of: a location of a group resource, a size of a group resource, a user terminal bitmap, a primary resource bitmap, a secondary resource indication enable, a secondary resource indication bitmap, and an MCS bitmap.

The resource allocation information includes the MCS bitmap when there are multiple MCSs in a group; and the resource allocation information includes no MCS bitmap when there is only one MCS in a group.

MCSs of a group are a set of multiple successive or discrete MCSs, and a 1-bit MCS succession indicator is used for indicating whether or not the MCSs of a group are successive;

when the MCS succession indicator indicates that the MCSs of a group are successive, the group message describes a starting MCS and a number of the successive MCSs; or the group message describes a starting and a terminating MCSs; and when the MCS succession indicator indicates that the MCSs of a group are discrete, the group message describes a number of the MCSs of the group and each MCS of the group.

The primary resource bitmap indicates the user resource used in the first case with predetermined bits; the first case comprises: a case where n or more resource units are occupied by a data packet of a predetermined service in a silent period, and a case where description overhead of the secondary resource indication bitmap is greater than that of the primary resource bitmap when all user-side equipments are indicated by the primary resource bitmap.

The secondary resource indication enable indicates and enables the secondary resource indication bitmap with one bit in the second case, and describes the secondary resource indication bitmap; the second case comprises: a case where the description overhead of the secondary resource indication bitmap is smaller than that of the primary resource bitmap when all user-side equipments are indicated by the primary resource bitmap, and the user-side equipments occupy only one resource unit.

The primary resource bitmap describes the resources of corresponding user-side equipments when the secondary resource indication enable is disenabled.

The step of performing an initialization description for each group by a user resource management device according to a group message comprises initializing each group via the group initialization message; the group initialization message describes the basic information of each group and the resource allocation information of the user-side equipments in each group; the basic information includes: a group identifier, a MCS of a group, a number of the user-side equipments in a group, and a user terminal identifiers of the user-side equipments in a group.

The group identifier indicates group index to which the group initialization message belongs; and the user terminal identifiers are described by the user resource management device according to the ascending order of the location indexes of the corresponding bits of the user-side equipments in a user terminal bitmap.

The group maintenance message is used for performing update and maintenance operation to each group, the update and maintenance operation comprises: addition of a user-side equipment, resource allocation for a user-side equipment in a group, and removal of a user-side equipment.

The group maintenance message includes: a group identifier, an indicator indicative of addition of a new user-side equipment in a group, an indicator indicative of removal of a user-side equipment from a group, and an indicator indicative of a number of the user-side equipments in a group.

When a new user-side equipment is added in a group, the indicator indicative of the addition of a new user-side equipment in a group is set to be 'addition of a new user-side equipment' and the number of the new user-side equipments is described; and the user terminal identifiers of all user-side equipments are described according to the ascending order of the location indexes of the corresponding bits of the new user-side equipments in the user terminal bitmap; if there is a need to add the new user-side equipments in the user terminal bitmap, the user resource management device describes, in the group maintenance message, a starting location index of the new user-side equipments orderly added in the user terminal bitmap; and when no new user-side equipment is added in the group, the indicator indicative of the addition of a new user-side equipment in a group is set to be 'no addition of a new user-side equipment'.

When a user-side equipment is removed from a group, the indicator indicative of the removal of a user-side equipment from a group is set to be 'removal of a user terminal' and the number of the removed user-side equipments is described; and the indexes of the removed user-side equipments in the user terminal bitmap are described according to the ascending order of the location indexes of the corresponding bits of the removed user-side equipments in the user terminal bitmap; and when no user-side equipment is removed from the group, the indicator indicative of the removal of a user-side equipment is set to be 'no removal of a user terminal'.

when the number of the user-side equipments in a group is changed, the indicator indicative of the number of the user-side equipments in a group is set to be 'changed', and a current number of the user-side equipments in the group is described; and when the number of the user-side equipments in a group is unchanged, the indicator indicative of the number of the user-side equipments in a group is set to be 'unchanged'.

When there is removal of a user-side equipment from a group but no addition of a new user-side equipment, the method further comprises the following step that:

a user-side equipment originally located in the group compares its index in the user terminal bitmap with a index of the first removed user-side equipment, if the index of the user-side equipment originally located in the group is greater than that of the first removed user-side equipment, the number of the removed user-side equipments with a smaller index than the user-side equipment originally located in the group is calculated according to the index of each removed user-side equipment in the user terminal bitmap, and the changed magnitude of the index of the user-side equipment originally located in the group in the user terminal bitmap is calculated according to the number of the removed user-side equipments.

When there is addition of a new user-side equipment in a group but no removal of a user-side equipment from the group, the method further comprises the following step that:

the starting location index of a new added user-side equipment in the user terminal bitmap is equal to the length of the former user terminal bitmap plus 1, and the new user-side equipment is orderly added in the existing user terminal bitmap according to the description order of the user terminal identifier of the new user-side equipment in the user terminal identifiers of all new user-side equipments.

When N user-side equipments are removed from a group while M new user-side equipments are added in the group and M is equal to N, the method further comprises the following steps that:

the user resource management device describes, in the group maintenance message, the indexes of the N removed user-side equipments in the user terminal bitmap, and describes the user terminal identifiers of the M new user-side equipments; and when the indexes of the other user-side equipments of the group in the user terminal bitmap are unchanged, the new user-side equipments orderly use the indexes of the removed user-side equipments in the user terminal bitmap according to the indexes of the removed user-side equipments in the user terminal bitmap, the description order of the removed user-side equipments and the description order of the user terminal identifiers of the new user-side equipments in the user terminal identifiers of all new user-side equipments and orderly replace the removed user-side equipments at corresponding locations in the user terminal bitmap.

When N user-side equipments are removed from a group while M new user-side equipments are added in the group and M is smaller than N, the method further comprises the following steps that:

the user resource management device orderly describes, in the group maintenance message, the index of each removed user-side equipment in the user terminal bitmap according to the ascending order of the indexes of the removed user-side equipments in the user terminal bitmap, and describes the user terminal identifiers of the M new user-side equipments;

the M new user-side equipments orderly use the indexes of the first M removed user-side equipments in the user terminal bitmap and replace the first M removed user-side equipments at corresponding locations in the user terminal bitmap; and the user-side equipment located after the (M+1)th removed user-side equipment in the user terminal bitmap compares its location index in the user terminal bitmap with those of the last (N−M) removed user-side equipments in the user terminal bitmap, the number of the removed user-side equipments with a smaller index than the user-side equipment located after the (M+1)th removed user-side equipment in the user terminal bitmap is calculated, and the changed magnitude of each of the indexes of the user equipments located after the (M+1)th removed user-side equipment in the user terminal bitmap is calculated according to the number of the removed user-side equipments.

When N user-side equipments are removed from a group while M new user-side equipments are added in the group and M is greater than N, the method further comprises the following steps that:

the user resource management device orderly describes, in the group maintenance message, the index of each removed user-side equipment in the user terminal bitmap according to the ascending order of the indexes of the removed user-side equipments in the user terminal bitmap, and describes the user terminal identifiers of the M new user-side equipments;

the first N new user-side equipments orderly use the indexes of the first N removed user-side equipments in the user terminal bitmap and replace the N removed user-side equipments at corresponding locations in the user terminal bitmap;

the starting location of the addition of the remaining (M−N) ordinal new user-side equipments in the user terminal bitmap is equal to the length of the former user terminal bitmap plus 1, and the user-side equipments corresponding to the user terminal identifiers of the remaining (M−N) new user-side equipments are orderly added in the existing user terminal bitmap according to the description order of corresponding user terminal identifiers in user terminal identifiers.

The user resource management device is a base station, and the user-side equipment is a user terminal.

It can be seen from above that by grouping user-side equipments according to the service type and the modulation and coding scheme of the user-side equipments, the method disclosed in the present invention solves the problem existing in related technologies that the grouping for a group resource allocation is subjected to many limitations and high in both complexity and overhead and lowers the overhand of group resource allocation description.

BRIEF DESCRIPTION OF THE DRAWINGS

FIG. 3 is a schematic diagram illustrating a user terminal bitmap and an MCS bitmap indicator according to an example 1 of an embodiment of the present invention;

FIG. 4 is a schematic diagram illustrating the indication of a resource allocation by a primary resource bitmap according to an example 1 of an embodiment of the present invention;

FIG. 11 is a schematic diagram illustrating an example 4 according to an embodiment of the present invention;

DETAILED DESCRIPTION

There exists a problem in the existing grouping for a group resource allocation that the grouping is subjected to many limitations and high in both complexity and overhead. The present invention provides a technical solution for addressing this problem, in this technical solution, a base station groups user terminals according to their service types or Modulation and Coding Schemes (MCSs), performs an initialization description and/or update and maintenance description for each group via a group message, and describes the resource allocation information of the user terminals in each group to realizes a group resource allocation.

The preferred embodiments of the invention are illustrated below in conjunction with accompanying drawings, and it should be appreciated that the preferred embodiments herein are only for illustrating and explaining the invention but not for limiting the invention.

In the following description, for the purpose of explanation, a plurality of specific details are described to make the invention understood thoroughly. However, it is apparent that the invention can be achieved without these specific details, and the following embodiments and the details in these embodiments can be variously combined without departing from the spirit and scope illustrated by the appended claims.

Figure 1:
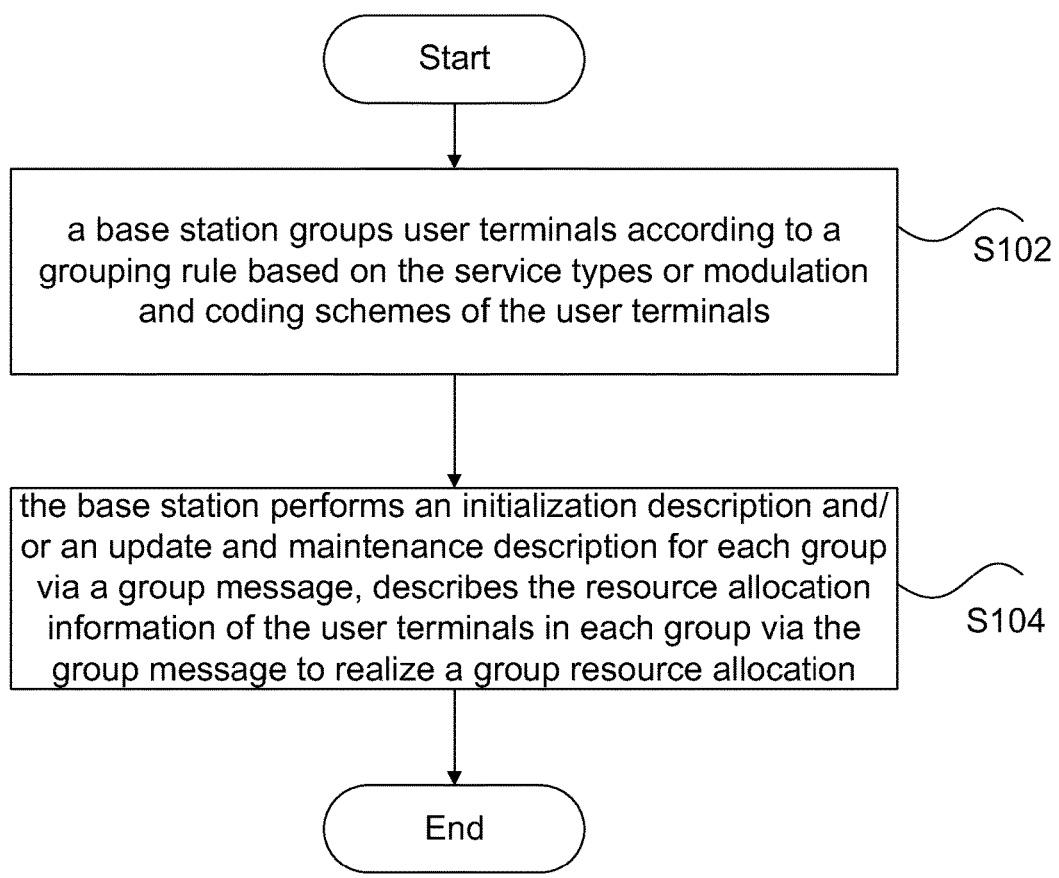
FIG. 1 is a flow chart of a group resource allocation method according to an embodiment of the present invention.

According to an embodiment of the invention, a group resource allocation method is provided. FIG. 1 is a flow chart of a group resource allocation method according to an embodiment of the invention. As shown in FIG. 1, the method comprises the following steps (steps S102-S104):

Step S102: a base station groups user terminals according to a grouping rule based on the service types or modulation and coding schemes of the user terminals;

specifically, according to the grouping rule based on the service type of the user terminals, the user terminals of the same service type are divided into one group, and one MCS or a set of a limited number of MCSs is involved in the group; and according to the grouping rule based on the MCSs of the user terminals, the user terminals using the same MCS are divided into one group, and one or multiple service types are involved in the group; and Step S104: the base station performs an initialization description and/or an update and maintenance description for each group via a group message, describes the resource allocation information of the user terminals in each group via the group message to realize a group resource allocation.

Specifically, the group message includes the control messages of one or more groups, which indicates the number of initialized groups (that is, groups that are being initialized) and the number of maintained groups (that is, groups that are being maintained), and respectively describes the group initialization message of each initialized group and the group maintenance message of each maintained group, that is, the control message includes a group initialization message and a group maintenance message which correspond to the same message type index and are sent in a unicast service control channel.

The group initialization message is used for describing the basic attributes, for example, MCS configuration, of a group established by a base station and additional information related to a resource schedule after the user terminal belonging to a group are added in the group.

The group maintenance message is used for managing the groups established by a base station to realize at least the following basic functions: addition of a user terminal, a resource allocation for the user terminals in a group, and removal of a user terminal and other basic functions, and dedicatedly describing the changed attribute of a group during a maintenance process so as to reduce overhead.

It can be seen from the above description on the group initialization message and the group maintenance message, the group initialization message and the group maintenance message are both capable of describing the resource allocation information of the user terminals in a group.

In practical application, the resource allocation information comprises at least one of: a location of a group resource, a size of a group resource, a user terminal bitmap, a primary resource bitmap, a secondary resource indication enable, a secondary resource bitmap, and a modulation and coding scheme bitmap, wherein the secondary resource indication bitmap is included in the resource allocation information only when the secondary resource indication enable is enabled.

Specifically, the resource location information and the resource size information of a whole group are included in the resource allocation information to indicate the starting location of the resources of the whole group at a downlink or uplink physical frame and the number of the occupied downlink or uplink resources, moreover, the location and the size of a group resource are variable. The resource allocation information further includes a user terminal bitmap (MS Bitmap), in which each user terminal occupies one bit, and which is used for indicating whether or not a user terminal uses a resource with a bit corresponding to the user terminal. It should be noted that the length of the MS Bitmap is equal to the number of the user terminals in a group.

Additionally, the resource allocation information further includes a primary resource bitmap, a secondary resource indication enable, and a secondary resource indication bitmap.

The primary resource bitmap may indicate a user resource in a common case or in a special case, wherein the special case includes but is not limited to: a case where a data packet of a VoIP service in a silent period (SID packet) occupies n or more resource units (n is configured by a base station), or a case where the description overhead of a secondary resource indication bitmap is higher than that of the primary resource bitmap when all user terminals are indicated by the primary resource bitmap, it should be noted that each N bits in the primary resource bitmap indicate the size information of a resource used by a user terminal.

The secondary resource indication enable is one-bit indicator for indicating whether or not to enable the secondary resource indication bitmap. When the description overhead of the secondary resource indication bitmap is smaller than that of the primary resource bitmap when all user terminals are indicated by the primary resource bitmap, and the user terminals only occupy one resource unit (for instance, when there are many user terminals in a group, which are in a silent period and only occupy one resource unit), the secondary resource indication enable is set to be 1, and the secondary resource indication bitmap is described. It should be noted that the secondary resource indication bitmap is a bitmap describing the resources used by a user terminal, for instance, a user terminal corresponding to a bit '1' in the secondary resource indication bitmap can only use one resource unit, and the size of a resource for a user terminal corresponding to a bit '0' in the secondary resource indication bitmap is indicated by the primary resource bitmap.

It can be seen from the above description that the primary resource bitmap and the secondary resource indication bitmap enabled by the secondary resource indication enable indicate the location and the size of a resource used by each user terminal in the group.

Additionally, the resource allocation information further includes an MCS bitmap when there are multiple kinds of MCSs in a group and no MCS bitmap when there is only one kind of MCS in a group. Each predetermined number of bits in the MCS bitmap indicates the MCS of a user terminal, wherein the number of the bits (that is, the predetermined bits) for indicating the MCS of a user terminal is determined by the MCS configuration of a group.

In step S104, a group is initialized via a group initialization message. Specifically, as stated above, the group initialization message is used for describing the basic information of each group and the resource schedule information of the user terminals in each group, and when a group is being initialized, the basic attributes for describing the group include: a group identifier, the MCS configuration of a group, the number of the user terminals included in a group, and the user terminal identifier of each user terminal in a group.

Specifically, the group identifier is used for indicating the group index to which a group initialization message belongs, and the MCS of a group can be configured as a set of a limited number of successive MCSs or a set of discrete MCSs. Moreover, in practical application, a 1-bit MCS succession indicator may be used for indicting whether or not the MCSs in a group are successive. When the indicator is 1, the MCSs in a group are successive, and the starting MCS and the number of the successive MCSs are described, or the starting MCS and the terminating MCS are described.

And when the indicator is 0, the MCSs in a group are discrete, the number of the MCSs in the group and each MCS are described.

The group initialization message further describes the number of the user terminals added in a group. The base station orderly allocates a user terminal identifier for each user terminal according to the ascending order of the location indexes of the corresponding bits of the user terminals in the MS Bitmap. When receiving the group initialization message, a user terminal analyzes the identifiers of all user terminals and determines its own index in the MS Bitmap according to the description order of its own user terminal identifier (MS identifier) in all MS identifiers, wherein the index of the first described user terminal in the MS Bitmap is 0, and the indexes of the user terminals orderly described thereafter are orderly increased in the MS Bitmap.

Figure 2:
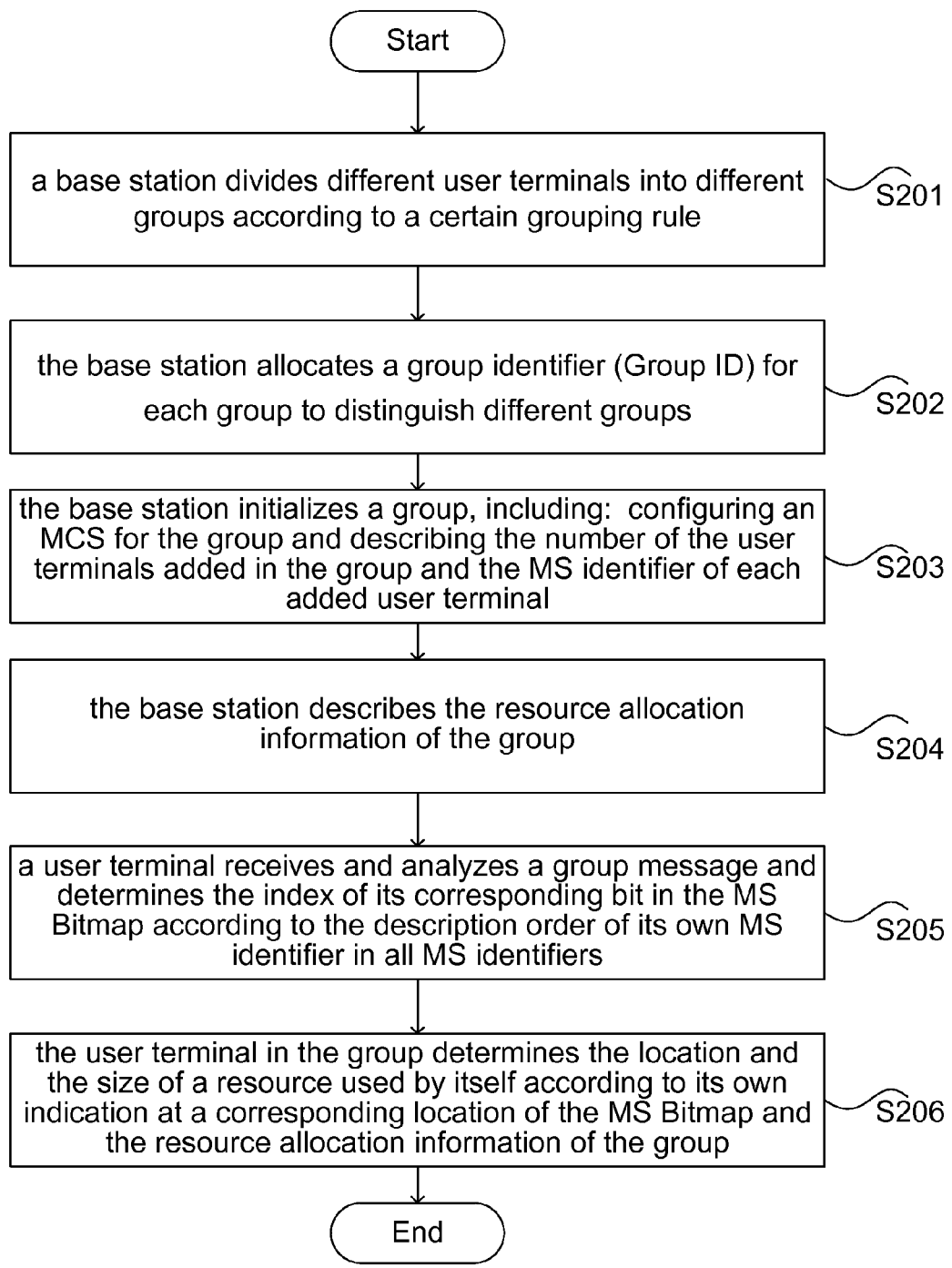
FIG. 2 is a flow chart of an initialization processing on a group by a base station according to an embodiment of the present invention.

The technical solution above is described below in conjunction with accompanying drawings. FIG. 2 is a flow chart of an initialization processing on a group by a base station according to an embodiment of the present invention. As shown in FIG. 2, the processing comprises the following steps:

Step 201: a base station divides different user terminals into different groups according to a certain grouping rule;

Step 202: the base station allocates a group identifier (Group ID) for each group to distinguish different groups;

Step 203: the base station initializes a group, including: configuring an MCS for the group and describing the number of the user terminals added in the group and the MS identifier of each added user terminal;

Step 204: the base station describes the resource allocation information of the group, wherein the resource allocation information includes: the MS Bitmap of the group, the location and the size of a resource of the group, the primary resource bitmap of the group, and a secondary resource indication enable; when there exist multiple MCSs in a group, the base station further describes the MCS bitmap of the group, and describes the secondary resource indication bitmap when the secondary resource indicator is enabled;

Step 205: a user terminal receives and analyzes a group message and determines the index of its corresponding bit in the MS Bitmap according to the description order of its own MS identifier in all MS identifiers; and Step 206: the user terminal in the group determines the location and the size of a resource used by itself according to its own indication at a corresponding location of the MS Bitmap and the resource allocation information of the group.

The initialization on the group by the base station is described in detail below in conjunction with accompanying drawings.

Example 1

Figure 5:
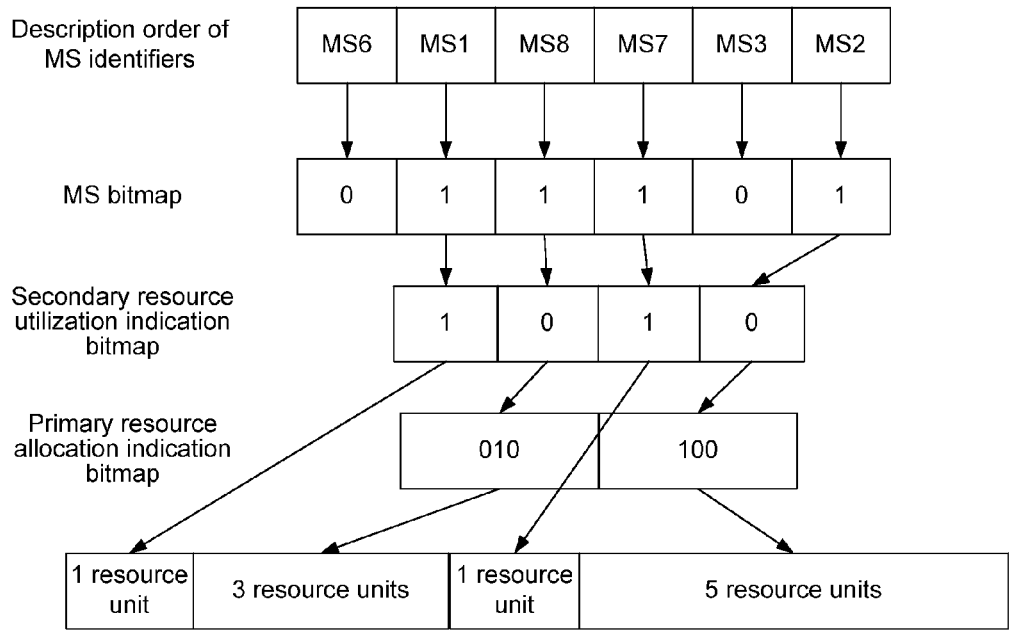
FIG. 5 is a schematic diagram illustrating the indication of a resource allocation by a secondary resource indication bitmap according to an example 1 of an embodiment of the present invention.

Step 301: assuming that the base station adopts a grouping rule based on service type, six user terminals (MS6, MS1, MS8, MS7, MS3 and MS2) of the same VoIP service type are divided into one group, and there exist three kinds of MCSs, that is, QPSK 1/2, QPSK 3/4 and 16 QAM 1/2, in the group and the MCSs are successive;

Step 302: the base station allocates a group ID '001' for the group;

Step 303: the base station initializes the group and describes the MCS configuration of the group; assuming that there are totally 20 kinds of MCSs allocated by the group, then an overhead of 5 bits (ceil (log 2 (20))=5) is needed; and assuming that three kinds of MCSs in the group are respectively the third, the fourth and the fifth kinds of MCSs in all MCSs, then corresponding MCS indexes are 00010, 00011, 00100, respectively, and the base station sets an MCS succession indicator to be 1 in a group initialization message and describes the starting MCS index as 00010 and the number of successive MCSs as 010;

Step 304: the base station initializes the user terminals in the group, orderly describes the six user terminals added in the group, and respectively indicates the user terminal identifiers (Station ID) of the six user terminals; assuming that the Station IDs of the six user terminals added in the group are described in the following order: MS6, MS1, MS8, MS7, MS3 and MS2, the indexes of the six user terminals in a user terminal bitmap are arranged in the following ascending order that is the same as the description order of the Station IDs: MS6, MS1, MS8, MS7, MS3 and MS2;

Step 305: the base station describes the location and the size of a resource of the group 001;

Step 306: the base station describes the user terminal bitmap; FIG. 3 is a schematic diagram illustrating a user terminal bitmap and an MCS bitmap indicator according to the example 1 of an embodiment of the present invention, as shown in FIG. 3, it is assumed that each user terminal corresponds to one bit in the MS Bitmap and the user terminals using resources are MS1, MS8, MS7 and MS2, then the MS Bitmap indicator of the group is 011101; the bit '1' in the MS Bitmap indicates a user terminal using a resource, and the bit '0' in the MS Bitmap indicates a corresponding user terminal using no resource;

Step 307: the base station describes the MCS bitmap of the group; as shown in FIG. 3, the number of bits in the MCS bitmap for indicating the MCS of a user terminal is 2 (ceil(log 2(3))=2), that is, each two bits indicate the MCS of a user terminal, wherein '00' represents QPSK 1/2, '01' represents QPSK 3/4, and '10' represents 16 QAM 1/2; assuming that the MCSs of the user terminals using resources (MS1, MS8, MS7 and MS2) are respectively QPSK 3/4, QPSK 1/2, 16 QAM 1/2 and QPSK 1/2, then the MCS bitmap is 01001000;

Step 308: the base station indicates the primary resource bitmap of the group and the secondary resource indication enable; FIG. 4 is a schematic diagram illustrating the indication of a resource allocation by a primary resource bitmap according to an example 1 of an embodiment of the present invention, as shown in FIG. 4, it is assumed that three bits are needed to indicate the size of the resource of a user terminal in the primary resource bitmap, wherein three bits '000' indicates that a user terminal occupies one resource unit, and three bits '111' indicates that a user terminal occupies 8 resource units; user terminals MS1, MS8, MS7 and MS2 respectively use resources of one resource unit, three resource units, one resource unit and five resource units, wherein MS8 and MS2 are in a voice-activated period, and MS1 and MS7 are in a silent period; if the resources of the four user terminals are all indicated by the primary resource bitmap, the secondary resource indication bitmap is disenabled, and the second resource indication enable is set to be 0, the primary resource bitmap would be 000010000100 of 12 bits, wherein '000' indicates one resource unit, '010' indicates three resource units, and '100' indicates five resource units;

Step 309: FIG. 5 is a schematic diagram illustrating the indication of a resource allocation by a secondary resource bitmap according to an example 1 of an embodiment of the present invention, as shown in FIG. 5, if the secondary resource indication bitmap is enabled and the secondary resource indication enable is set to be 1, the secondary resource indication bitmap corresponding to four user terminals MS1, MS8, MS7 and MS2 is 1010, which indicates that MS1 and MS7 are in a silent period and use only one resource unit using no primary resource bitmap to indicate resources, and MS8 and MS2 use the primary resource bitmap to indicate resources; the primary resource bitmap is 010100, indicating that MS8 and MS7 respectively use resources of three resource units and five resource units; the overhead of an indication of four user terminal resources by the secondary resource indication bitmap and the primary resource bitmap is 10 bits, which is 2 bits smaller than the overhead of the same indication completely by the primary resource bitmap;

Step 310: user terminals MS6, MS1, MS8, MS7, MS3 and MS2 learn, through an analysis, that the group with a group ID '001' contains their MS identifiers, analyze the group initialization message of the group, and record the group ID for analyzing the group maintenance message of the group; the user terminals determine their indexes in the MS Bitmap according to the description order of their MS identifiers in all MS identifiers, for instance, the MS identifier of MS6 is the first one described in all MS identifiers, then MS6 would correspond to the first location in the MS Bitmap, and the index of MS6 is '0', and the MS identifier of MS7 is the fourth one described in all MS identifiers, then MS7 would correspond to the fourth location in the MS Bitmap, and the index of MS7 is '011';

Step 311: each user terminal analyzes the bit in the MS Bitmap corresponding to itself, wherein user terminals MS1, MS8, MS7 and MS2 analyze that their corresponding bits are all '1' and then learn that they are allocated with resources;

Step 312: all user terminals learn, through an analysis, that the MCSs of the group are configured to be a set of successive MCSs, the starting MCS index is 00010, the number of successive MCSs is 3, and the MCSs of the group are QPSK 1/2, QPSK 3/4 and 16 QAM 1/2, and calculate the number of the bits in the MCS bitmap for indicating the MCS of a user terminal as follows: the number is equal to 2 (ceil(log 2(3))=2); MS1, MS8, MS7 and MS2 corresponding to the bits '1' in the MS Bitmap analyze the MCS Bitmap to be 01001000 and then learn, according to their indexes in the MS Bitmap and the locations of the bits '1' in the MS Bitmap, that their corresponding MCSs are respectively 01, 00, 10 and 00, which correspond to QPSK 3/4, QPSK 1/2, 16 QAM 1/2 and QPSK 1/2 respectively;

Step 313: four resource-using user terminals analyze the secondary resource indication enable to be 1 and consequentially analyze the secondary resource indication bitmap to be 1010; MS1 and MS7 learn that they only use one resource unit; MS8 and MS2 learn that they use the primary resource bitmap not the secondary resource indication bitmap for an indication and therefore analyze the primary resource bitmap and then learn that their corresponding resource size indicators are respectively 010 and 100, that is, the resource sizes of MS8 and MS2 are 3 resource units and 5 resource units, respectively; each of MS1, MS8, MS7 and MS2 calculates its own starting location and the size of the resource according to the location and the size of the resources of the group, the secondary resource indication bitmap and the primary resource bitmap; for instance, MS1 analyzes that itself uses only one resource unit and then learns that it uses the first resource unit of the group resources; MS2 analyzes that MS1, MS8 and MS7 located before itself respectively use one resource unit, three resource units and one resource unit, and then learns that the resource units in the group resources for its use start from the sixth one and end with the tenth one.

Through the processing above, the base station adopts the secondary resource indication bitmap for a data packet in a silent period which occupies few resource units and therefore lowers the description overhead of a group resource allocation.

In Step S104, the group corresponding to the group ID is updated and maintained via the group maintenance message; the update and maintenance operation comprises: the addition of a user terminal, the resource allocation for a user terminal in a group, and the removal of a user terminal, wherein the group maintenance message includes: a group identifier, the indicator indicative of the addition of a new user terminal in a group, an indicator indicative of the removal of a user terminal from a group, and an indicator indicative of the number of the user terminals in a group.

The group ID in the group maintenance message is used for indicating the group to which the group maintenance message belongs; the group maintenance message further comprises an indicator indicative of the addition of a new user terminal (also called MS added indicator); when there is a new user terminal added in the group, the MS added indicator is set to be 1, the number of the new added user terminals is described, and the user terminal identifier of each user terminal is orderly described according to the ascending order of the location indexes of the corresponding bits of the new added user terminals in the MS Bitmap. If there is a need to add the new user terminals to the MS Bitmap, the base station describes, in the group message, the starting index for new user terminals (Start Index for Ordinal New MS) in the MS Bitmap, otherwise, sets the MS added indicator to be 0 to indicate no addition of a new user terminal.

The group maintenance message further comprises an indicator indicative of the removal of a new user terminal (also called MS removed indicator); when there is a user terminal removed from the group, the MS removed indicator is set to be 1, the number of the user terminals removed from the group is described, and the index of each removed user terminal in the MS Bitmap is orderly described according to the ascending order of the indexes of the removed user terminals in the MS Bitmap, otherwise, the MS removed indicator is set to be 0 to indicate there is no removal of a member from the group. When there is a new user terminal added in or a member removed from the group, the number of the members of the group may be changed. When the number of the members of the group is changed, an indicator indicative of the number of user terminals in the group (also called MS number indicator) describing the number of the user terminals in the group is set to be 1, and the number of the user terminals in the group is described. When the number of the user terminals in the group is unchanged, the MS number indicator describing the number of the user terminals in the group is set to be 0 to indicate that the number of the user terminals of the group is unchanged.

The addition of a new user terminal in a group and the removal of a user terminal from a group are respectively described in the following five cases.

Figure 6:
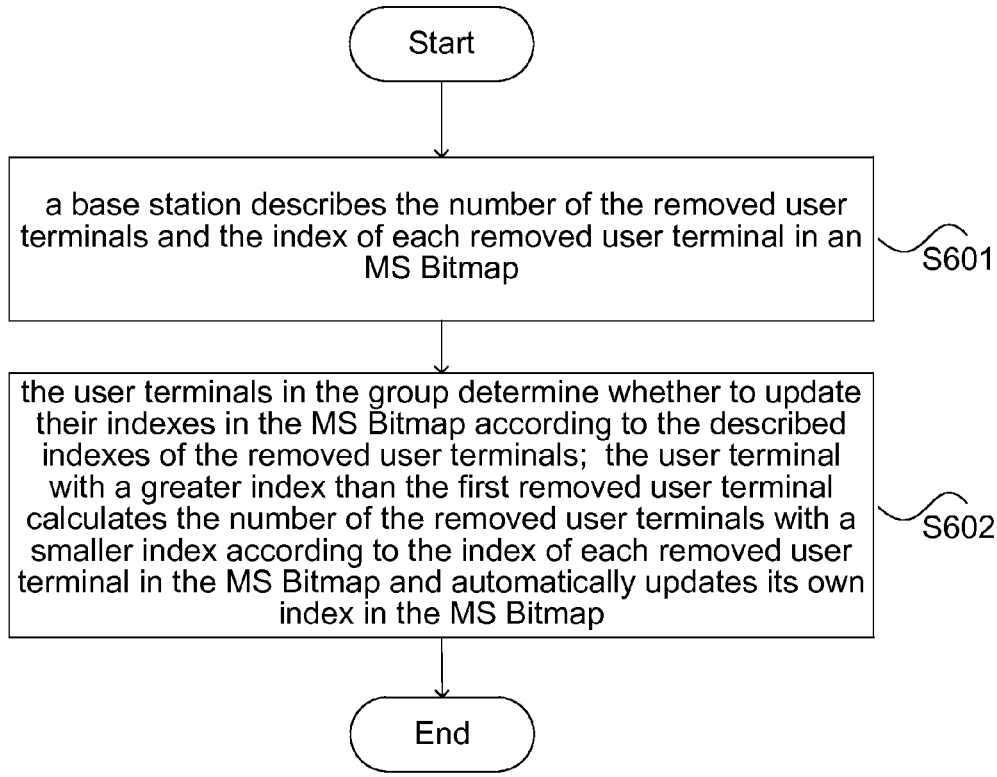
FIG. 6 is a flow chart in a first case according to an embodiment of the method of the present invention.

Case 1:

when there are user terminals removed from a group but no new user terminal is added in the group, a user terminal originally located in the group compares its index in an MS Bitmap with the index of the first removed user terminal, if the index of the user terminal originally located in the group is greater than that of the first removed user terminal, then the number of the removed user terminals with a smaller index than the user terminal originally located in the group is calculated according to the index of each removed user terminal in the MS Bitmap, and the changed magnitude of the index of the user terminal originally located in the group in the MS Bitmap is calculated according to the number of the removed user terminals. FIG. 6 is a flow chart in a case 1 according to an embodiment of the present invention. As shown in FIG. 6, this processing comprises the following steps:

Step 601: a base station describes the number of the removed user terminals and the index of each removed user terminal in an MS Bitmap; and Step 602: the user terminals in the group determine whether to update their indexes in the MS Bitmap according to the described indexes of the removed user terminals; the user terminal with a greater index than the first removed user terminal calculates the number of the removed user terminals with a smaller index according to the index of each removed user terminal in the MS Bitmap and automatically updates its own index in the MS Bitmap.

Figure 7:
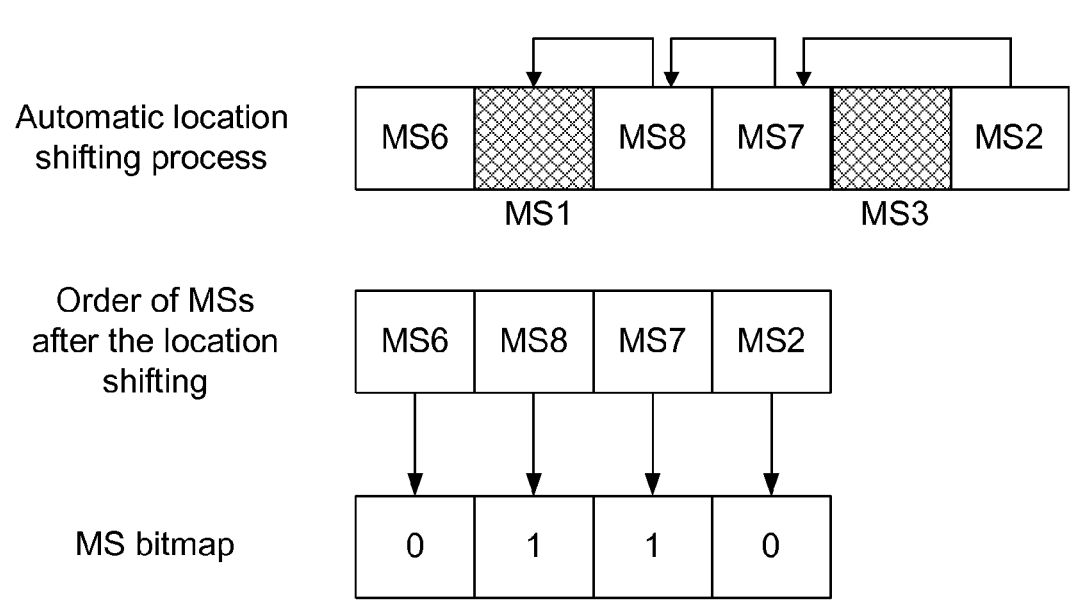
FIG. 7 is a schematic diagram illustrating an example 2 according to an embodiment of the present invention.

The flow of FIG. 6 is further described, by way of examples, below with reference to FIG. 7, the flow further comprises the following steps:

Step 701: as shown in FIG. 7, it is assumed that user terminals MS1 and MS3 are removed from the group with a group ID '001' and MS1 and MS3 are the second and the fifth user terminals in the MS Bitmap, respectively, then a base station describes the indexes of the removed user terminals as '001' and '100'; and Step 702: user terminal MS6 learns, through an analysis, that its own index is smaller than those of the removed user terminals 1 and 3, so MS1 needs no movement; MS8 learns, through an analysis, that its own index is smaller than that of the removed MS1 and greater than that of the removed MS3, and then subtracts 1 from its own index; similarly, MS7 subtracts 1 from its own index; and MS2 learns, through an analysis, that its own index is greater than those of MS1 and MS3, and then subtracts 2 from its own index, as shown in FIG. 7, after the location shifting, the location order of the user terminals is as follows: MS6, MS8, MS7 and MS2, and the corresponding MS Bitmap is 0110.

Figure 8:
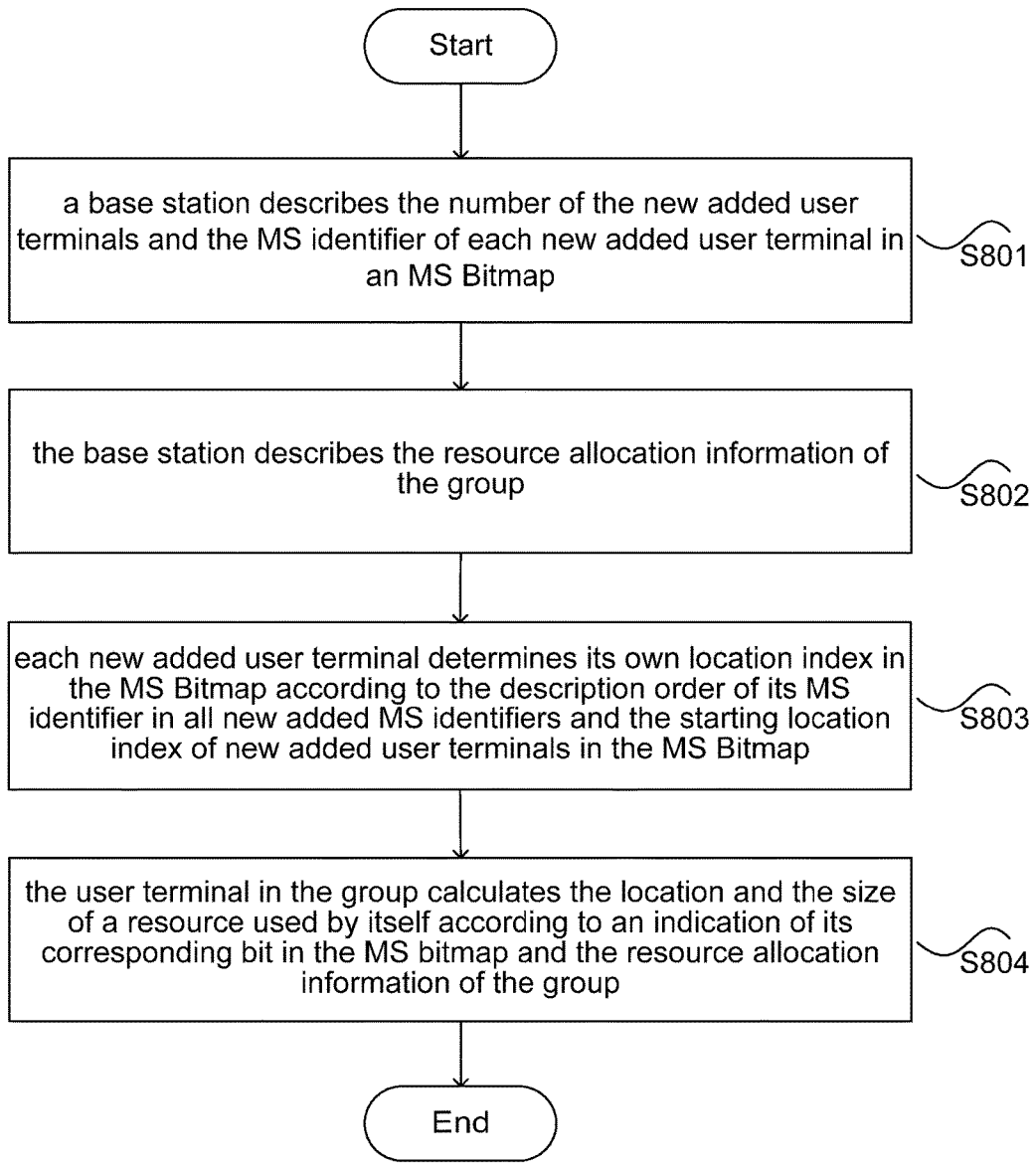
FIG. 8 is a flow chart in a second case according to an embodiment of the method of the present invention.

Case 2:

When there are new user terminals added in a group but no user terminal is removed from the group, the starting location index of ordinal new user terminals in the MS Bitmap is equal to the length of the former MS Bitmap plus 1, and the new user terminals are orderly added in the existing MS Bitmap according to the description order of its MS identifier in the MS identifiers of all new user terminals. FIG. 8 is a flow chart in a case 2 according to an embodiment of the present invention. As shown in FIG. 8, this flow comprises the following steps:

Step 801: a base station describes the number of the new added user terminals and the MS identifier of each new added user terminal in an MS Bitmap;

Step 802: the base station describes the resource allocation information of the group;

Step 803: each new added user terminal determines its own location index in the MS Bitmap according to the description order of its MS identifier in all new added MS identifiers and the starting location index of new added user terminals in the MS Bitmap; and Step 804: the user terminal in the group calculates the location and the size of a resource used by itself according to an indication of its corresponding bit in the MS bitmap and the resource allocation information of the group.

Figure 9:
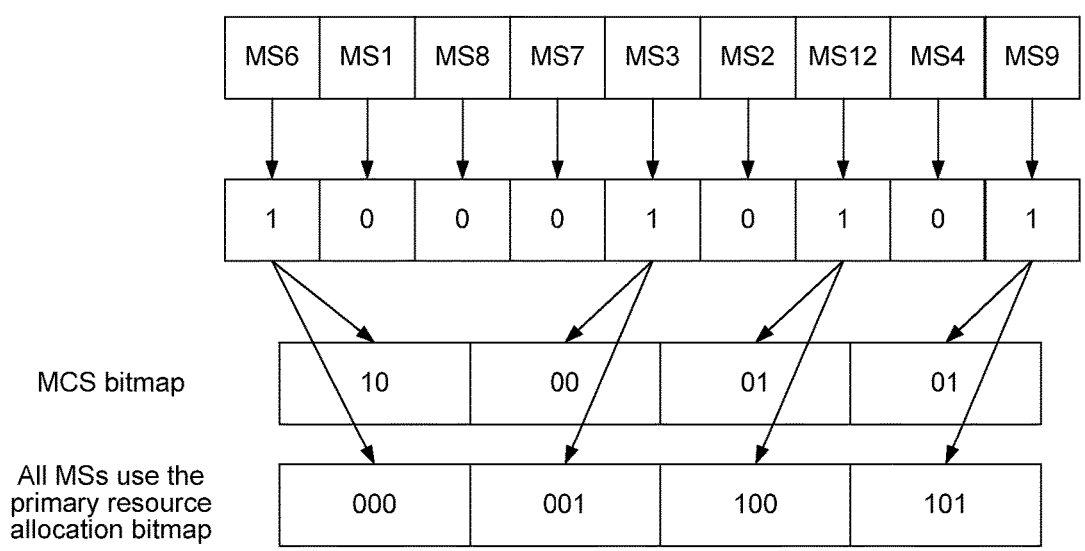
FIG. 9 is a schematic diagram illustrating an example 3 according to an embodiment of the present invention.

The flow of FIG. 8 is described, by way of examples, below with reference to FIG. 9, the flow further comprises the following steps:

Step 901: it is assumed that three user terminals (MS12, MS4 and MS9) are added in a group with a group ID '001', a base station describes the number of the new added user terminals and the MS identifiers of the new added user terminals; specifically, as shown in FIG. 9, the base station describes the starting location of the new added user terminals in the MS Bitmap to be '110' to indicate that the ordinal addition of new user terminals in the MS Bitmap starts from the seventh locations of the MS Bitmap;

Step 902: the base station describes the location and the size of a resource of the group and the MCS configuration of the group for new user terminals; the current resource-using terminals are MS6, MS3, MS12 and MS9, so the MS Bitmap is 100010101;

Step 903: assuming the MCSs of the user terminals MS6, MS3, MS12 and MS9 are 16 QAM 1/2, QPSK 1/2, QPSK 3/4 and QPSK 3/4, respectively, then the MCS bitmap is 10000101;

Step 904: assuming that MS6, MS3, MS12 and MS9 are all in a voice-activated period and respectively use resources of one resource unit, two resource units, five resource units and six resource units, then the resources of the four user terminals are all indicated by a primary resource bitmap which is 000001100101;

Step 905: the new added user terminals MS12, MS4 and MS9 are orderly added at the seventh, the eighth and the ninth locations of the MS Bitmap according to the description order of their MS identifiers in all new added MS identifiers and the starting location index '110' of the new user terminals in the MS Bitmap; and Step 906: user terminals MS6, MS3, MS12 and MS9 determine their resources are respectively the first, the second to the third, the fourth to the eighth, and the ninth to the fourteenth resource units according to the indication of their corresponding bits in the MS bitmap and the primary resource bitmap.

Figure 10:
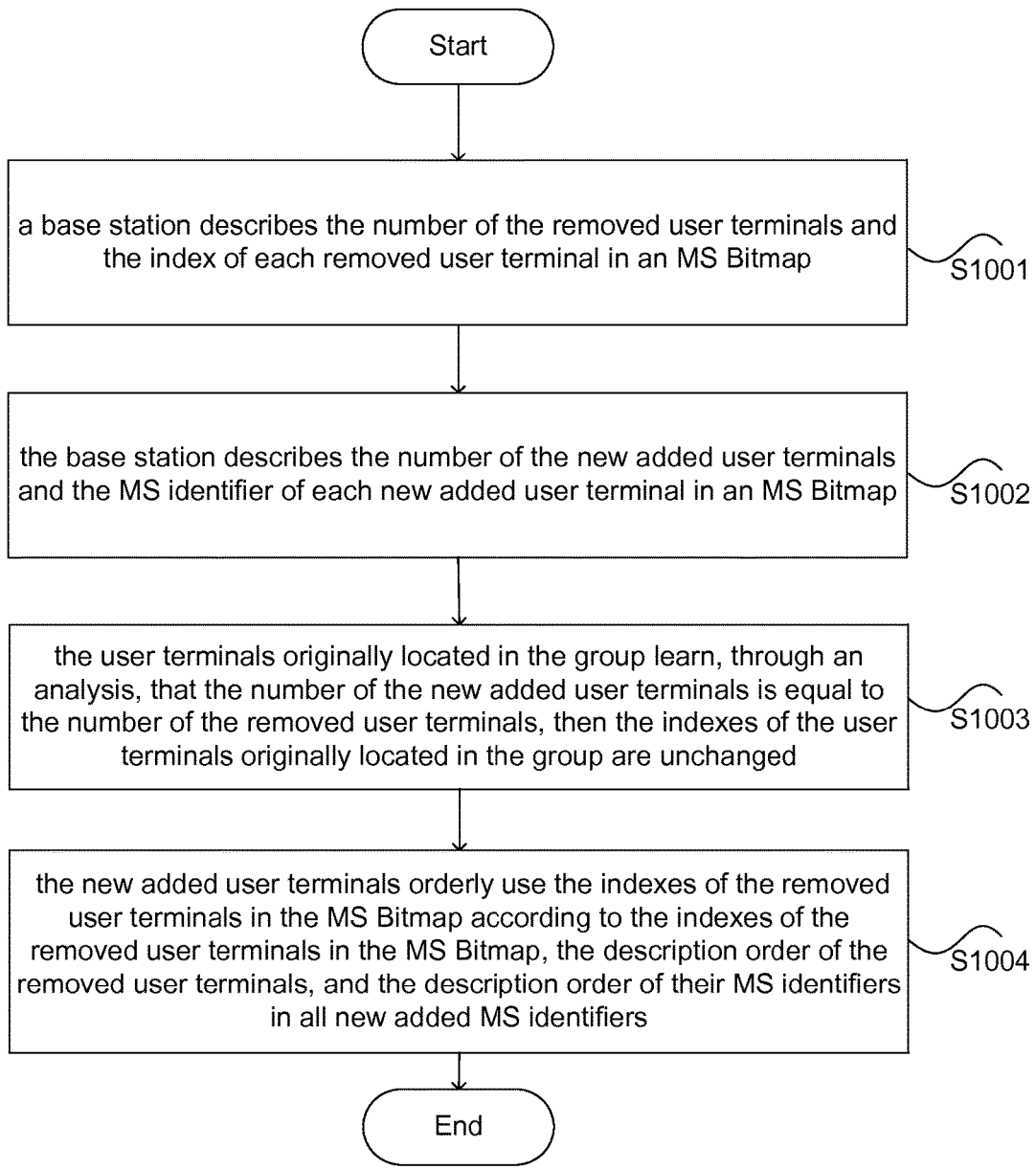
FIG. 10 is a flow chart in a third case according to an embodiment of the method of the present invention.

Case 3:

When N user terminals are removed from a group while M new user terminals are added to the group, if the number M of the new added user terminals is equal to the number N of the removed user terminals, then a base stations describes, in a group maintenance message, the indexes of the N removed user terminals in the MS Bitmap and describes the MS identifiers of the M new user terminals; in the case where the indexes of the other user terminals in the group are unchanged in the MS Bitmap, the new user terminals orderly use the indexes of the removed user terminals in the MS Bitmap and orderly replace the removed user terminals at corresponding locations of the MS Bitmap according to the indexes of the removed user terminals in the MS Bitmap, the description order of the removed user terminals and the description order of the MS identifiers of the new user terminals in the MS identifiers of all new user terminals. FIG. 10 is a flow chart in the case 3 according to an embodiment of the present invention. As shown in FIG. 10, this flow comprises the following steps:

Step 1001: a base station describes the number of the removed user terminals and the index of each removed user terminal in an MS Bitmap;

Step 1002: the base station describes the number of the new added user terminals and the MS identifier of each new added user terminal in an MS Bitmap;

Step 1003: the user terminals originally located in the group learn, through an analysis, that the number of the new added user terminals is equal to the number of the removed user terminals, then the indexes of the user terminals originally located in the group are unchanged; and Step 1004: the new added user terminals orderly use the indexes of the removed user terminals in the MS Bitmap according to the indexes of the removed user terminals in the MS Bitmap, the description order of the removed user terminals, and the description order of their MS identifiers in all new added MS identifiers.

The flow of FIG. 10 is described, by way of examples, below with reference to FIG. 11, the flow further comprises the following steps:

Step 1101: as shown in FIG. 11, it is assumed that user terminals MS12 and MS4 are added in the group with a group ID '001'; a base station describes the number of the new added user terminals to be 2 and orderly describes the MS identifiers of MS12 and MS4;

Step 1102: it is assumed that user terminals MS1 and MS3 are removed from the group with a group ID '001'; the base station describes the number of the new added user terminals to be 2, MS1 and MS3 are the second and the fifth user terminals in the MS Bitmap, respectively, then the base station describes the indexes of the removed user terminals as '001' and '100';

Step 1103: the user terminals MS6, MS8, MS7 and MS2 originally located in the group learn, through an analysis, that the number of the new added user terminals is equal to the number of the removed user terminals, and their indexes in the MS Bitmap need no change; and Step 1104: the new added user terminals MS 12 and MS4 respectively use the indexes of removed MS1 and MS3 in the MS Bitmap according to the indexes '001' and '100' of MS1 and MS3 in the MS Bitmap and the description order of MS1 and MS3.

Figure 12:
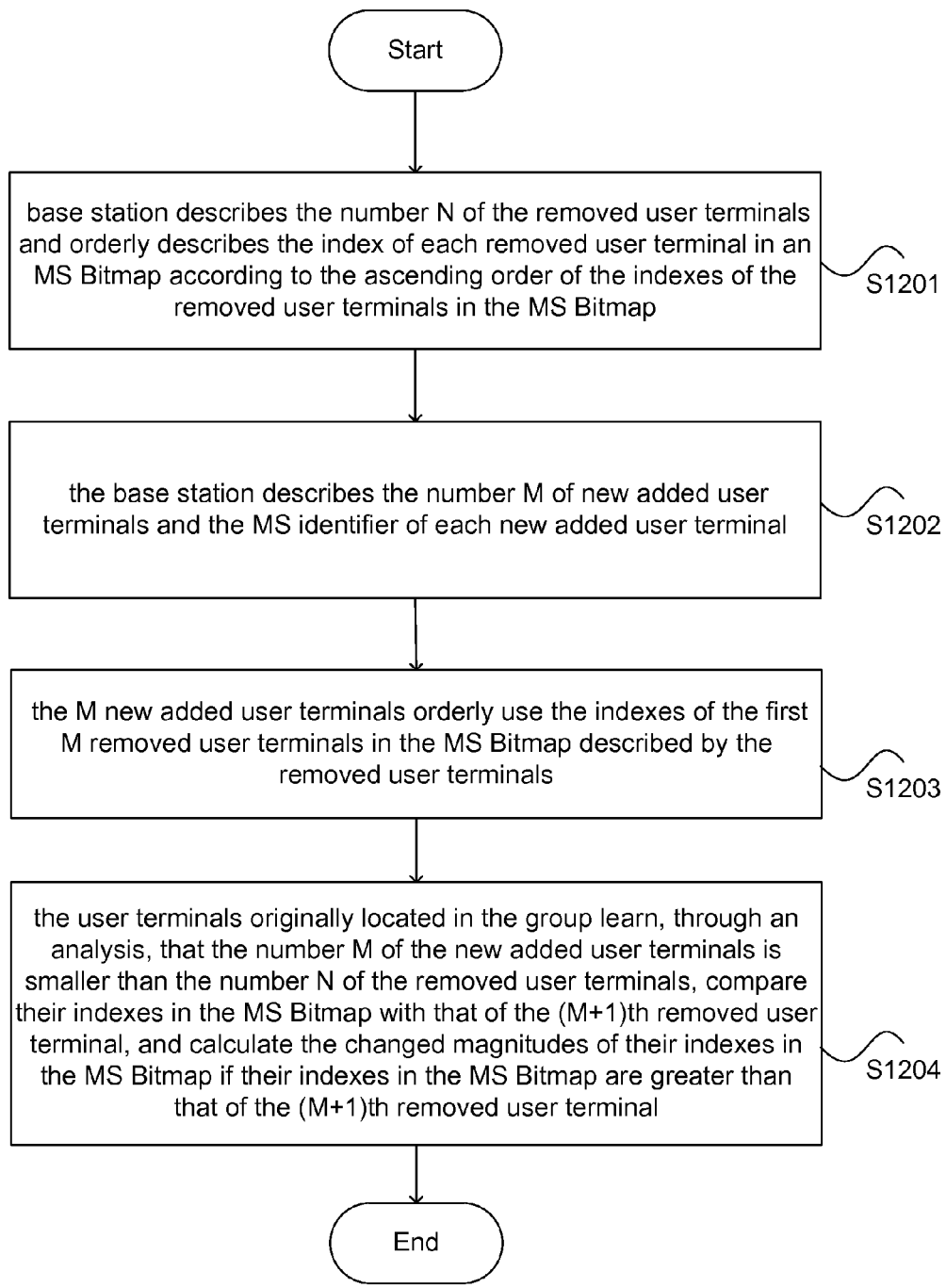
FIG. 12 is a flow chart in a fourth case according to an embodiment of the method of the present invention.

Case 4:

When N user terminals are removed from a group while M user terminals are added in the group and M is smaller than N, a base station orderly describes, in a group maintenance message, the index of each removed user terminals in an MS Bitmap according to the ascending order of the indexes of the removed user terminals in the MS Bitmap, and describes the MS identifiers of the M new user terminals, the M new user terminals orderly use the indexes of the first M removed user terminals in the MS Bitmap and replace the first M removed user terminals at corresponding locations of the MS Bitmap; the user terminals after the (M+1)th removed user terminals in the MS Bitmap compare their location indexes in the MS Bitmap with those of the last (N−M) removed user terminals in the MS Bitmap, calculate the number of the removed user terminals with a smaller index, and calculate the changed magnitude of their indexes in the MS Bitmap according to the number of the removed user terminals. FIG. 12 is a flow chart in a case 4 according to an embodiment of the method of the present invention. As shown in FIG. 12, the flow comprises the following steps:

Step 1201: a base station describes the number N of the removed user terminals and orderly describes the index of each removed user terminal in an MS Bitmap according to the ascending order of the indexes of the removed user terminals in the MS Bitmap;

Step 1202: the base station describes the number M of new added user terminals and the MS identifier of each new added user terminal;

Step 1203: the M new added user terminals orderly use the indexes of the first M removed user terminals in the MS Bitmap described by the removed user terminals; and Step 1204: the user terminals originally located in the group learn, through an analysis, that the number M of the new added user terminals is smaller than the number N of the removed user terminals, compare their indexes in the MS Bitmap with that of the (M+1)th removed user terminal, and calculate the changed magnitudes of their indexes in the MS Bitmap if their indexes in the MS Bitmap are greater than that of the (M+1)th removed user terminal.

Figure 13:
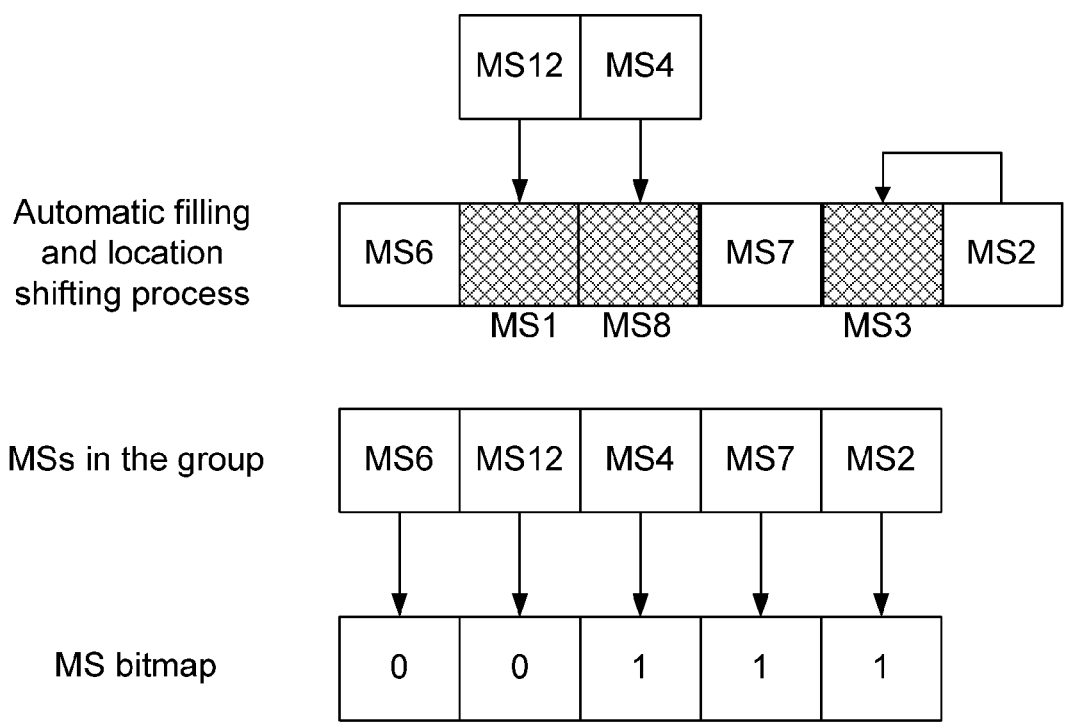
FIG. 13 is a schematic diagram illustrating an example 5 according to an embodiment of the present invention.

The flow of FIG. 12 is described, by way of examples, below with reference to FIG. 13, the flow further comprises the following steps:

Step 1301: as shown in FIG. 13, it is assumed that user terminals MS12 and MS4 are added to the group with a group ID '001'; a base station describes the number of the new added user terminals to be 2 and orderly describes the MS identifiers of MS12 and MS4;

Step 1302: it is assumed that user terminals MS1, MS8 and MS3 are removed from the group with a group ID '001'; the base station describes the number of the new added user terminals to be 3, MS1, MS8 and MS3 are the second, the third and the fifth user terminals in the MS Bitmap, respectively; the base station describes the indexes of MS1, MS8 and MS3 as '001', '010' and '100' according to the ascending order of the indexes of MS1, MS8 and MS3 in the MS Bitmap;

Step 1303: the two new added user terminals MS12 and MS4 orderly use the indexes of the first two removed user terminals MS1 and MS8 in the MS Bitmap described by the removed user terminals; and Step 1304: the user terminals originally located in the group learn, through an analysis, that the number 2 of the new added user terminals is smaller than the number 3 of the removed user terminals, and compare their indexes in the MS Bitmap with that of the third removed user terminal, and the user terminals with a greater index than MS3 subtract 1 from their indexes in the MS Bitmap.

Figure 14:
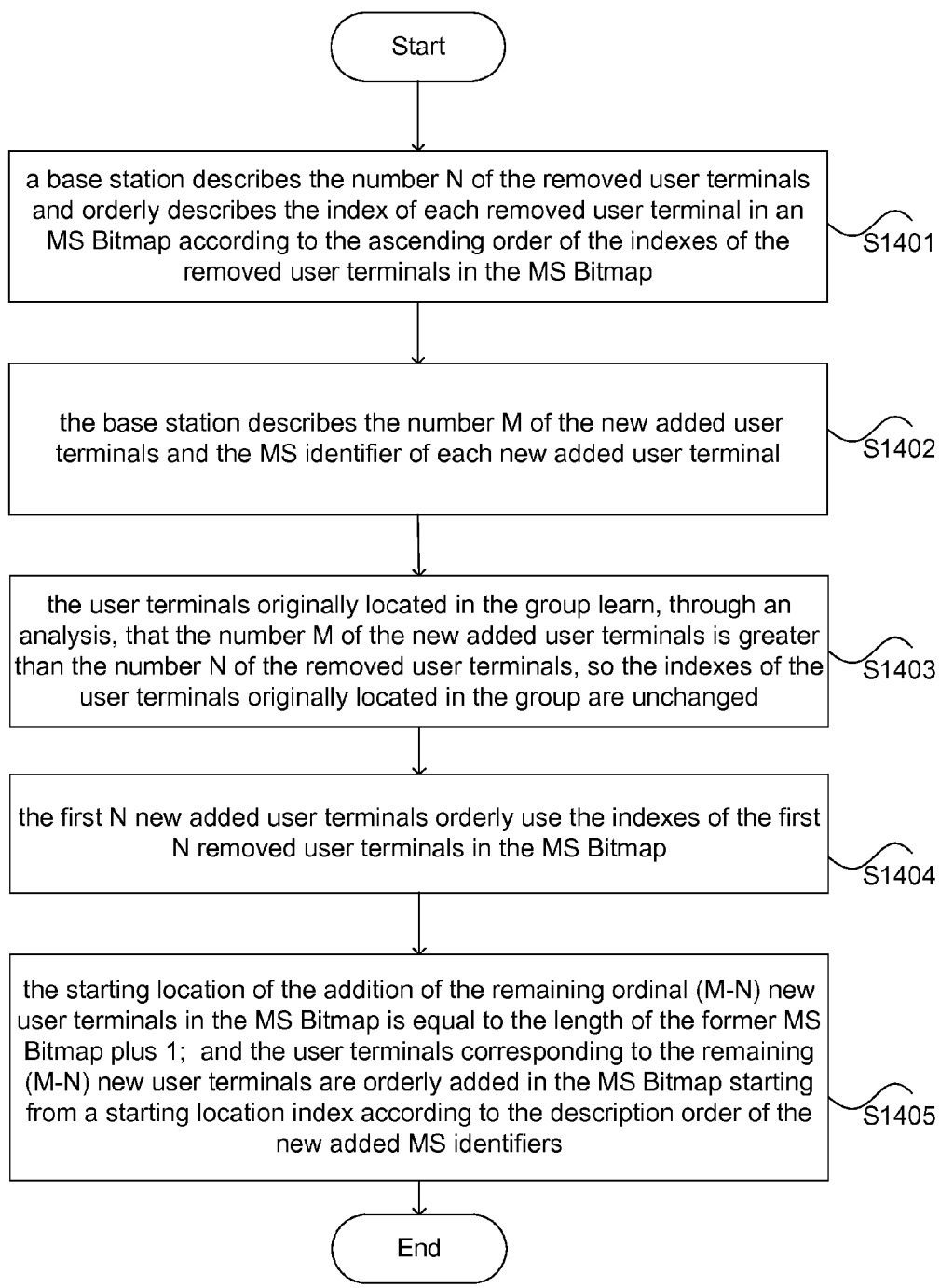
FIG. 14 is a flow chart in a fifth case according to an embodiment of the method of the present invention.

Case 5:

When N user terminals are removed from a group while M new user terminals are added in the group and M is greater than N, a base station orderly describes, in a group maintenance message, the index of each removed user terminal in an MS Bitmap according to the ascending order of the indexes of the removed user terminals in the MS Bitmap, and describes the MS identifiers of the M new user terminals. The first N new user terminals orderly use the indexes of N removed user terminals in the MS Bitmap and replace N removed user terminals at corresponding locations of the MS Bitmap, and the starting location of the addition of the remaining (M−N) ordinal new user terminals in the MS Bitmap is equal to the length of the former MS Bitmap plus 1, and the user terminals corresponding to the MS identifiers of the remaining (M−N) new user terminals are orderly added in the existing MS Bitmap according to the description order of corresponding MS identifiers in MS identifiers. FIG. 14 is a flow chart in a case 5 according to an embodiment of the present invention. As shown in FIG. 14, this flow comprises the following steps:

Step 1401: a base station describes the number N of the removed user terminals and orderly describes the index of each removed user terminal in an MS Bitmap according to the ascending order of the indexes of the removed user terminals in the MS Bitmap;

Step 1402: the base station describes the number M of the new added user terminals and the MS identifier of each new added user terminal;

Step 1403: the user terminals originally located in the group learn, through an analysis, that the number M of the new added user terminals is greater than the number N of the removed user terminals, so the indexes of the user terminals originally located in the group are unchanged;

Step 1404: the first N new added user terminals orderly use the indexes of the first N removed user terminals in the MS Bitmap; and Step 1405: the starting location of the addition of the remaining ordinal (M–N) new user terminals in the MS Bitmap is equal to the length of the former MS Bitmap plus 1; and the user terminals corresponding to the remaining (M–N) new user terminals are orderly added in the MS Bitmap starting from a starting location index according to the description order of the new added MS identifiers.

Figure 15:
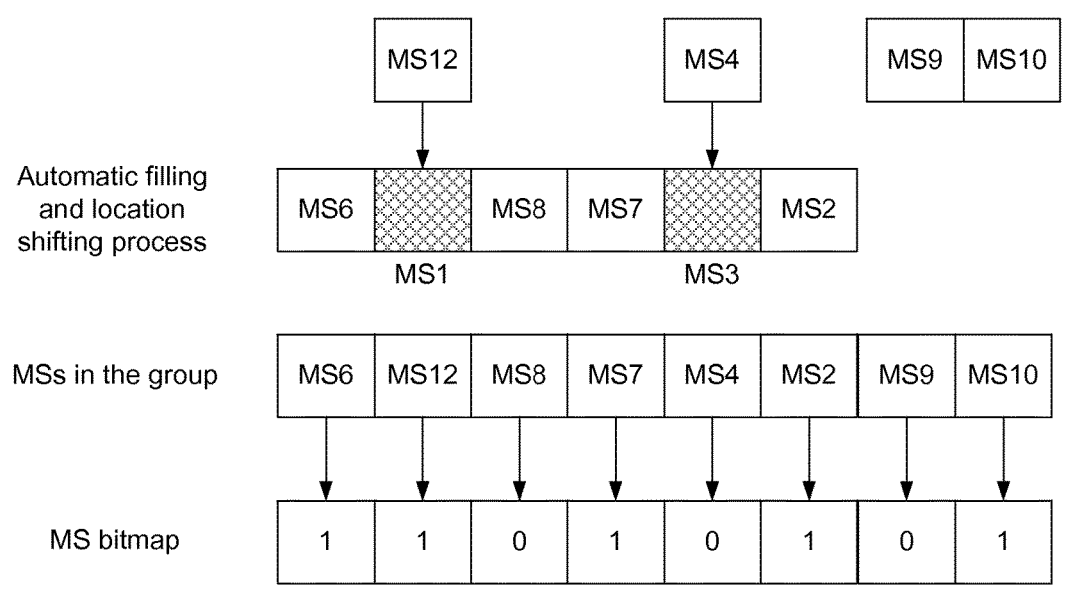
FIG. 15 is a schematic diagram illustrating an example 6 according to an embodiment of the present invention.

The flow of FIG. 14 is described, by way of examples, below with reference to FIG. 15, the flow further comprises the following steps:

Step 1501: as shown in FIG. 15, it is assumed that user terminals MS12, MS4, MS9 and MS10 are added in a group with a group ID '001', a base station describes the number of the new added user terminals to be 4 and the MS identifiers of the new added user terminals MS12, MS4 and MS9;

Step 1502: it is assumed that user terminals MS1 and MS3 are removed from the group with a group ID '001'; the base station describes the number of the new added user terminals to be 2, MS1 and MS3 are respectively the second and the fifth user terminals in the MS Bitmap; the base station describes the indexes of MS1 and MS3 to be '001' and '100' according to the ascending order of the indexes of MS1 and MS3 in the MS Bitmap;

Step 1503: the user terminals originally located in the group learn, through an analysis, that the number 4 of the new added user terminals is greater than the number 2 of the removed user terminals, so the indexes of the user terminals originally located in the group are unchanged;

Step 1504: the first two new added user terminals MS12 and MS4 orderly use the indexes of the first two removed user terminals MS1 and MS3 in the MS Bitmap; and Step 1505: the starting location index of the addition of the remaining two new user terminal MS9 and MS10 in the MS Bitmap is equal to the length of the former MS Bitmap plus 1, that is, the new user terminals are orderly added from the seventh location of the MS Bitmap; MS9 is added to the seventh location of the MS Bitmap with an index '110', and MS10 is added to the eighth location of the MS Bitmap with an index '111'.

It can be seen from the above processing that the new user terminals added in the group increase or performance a replacement automatically and orderly in the MS Bitmap, the other user terminals located after the removed user terminals automatically update their location indexes in the MS Bitmap, which saves the description overhead on the new locations of the user terminals the location which are changed in location in the MS Bitmap, and especially reduces the number of the user terminals changed and the description overhead of a group message in the scene where new user terminals are added in a group while user terminals are removed from the group.

In sum, by grouping user terminals according to a grouping rule based on service type and modulation and coding mode, the technical scheme disclosed in the present invention solves the problem existing in related technologies that the grouping for a group resource allocation is subjected to many limitations and high in both complexity and overhead. Additionally, for a data packet in a silent period occupying few resource units, a base station adopts a secondary resource indication bitmap, which lowers the description overhand of a group resource allocation. Furthermore, the new user terminals added in the group increase or perform a replacement automatically and orderly in the MS Bitmap, the other user terminals located after the removed user terminals automatically update their location indexes in the MS Bitmap, which saves the description overhead on the new locations of the user terminals which are changed in location in the MS Bitmap, especially reduces the number of the user terminals changed and the description overhead of a group message in the scene where new user terminals are added in a group while user terminals are removed from the group.

Apparently, it should be understood by those skilled in the art that the modules or steps of the invention can be realized by a universal computer, centralized on a single computer or distributed on a network consisting of multiple computers, and optionally realized by computer-executable program codes; the modules or steps can be therefore stored in a storage device to be executed by a computer or separately manufactured into integrated circuit modules, or some of the modules or steps are manufactured into a single integrated circuit module. Thus, the invention is not limited to any special combination of hardware and software.

Moreover, it can be known from the description above that the base station described in the present invention acts as a user resource management device, the functions of which can be achieved by any user resource management devices that is currently applied in a network and capable of realizing a resource management operation including resource allocation for a user terminal; similarly, the user terminals described in the present invention acts as a user-side equipment, the functions of which can be realized by any user-side equipments that are currently applied in a network and capable of realizing a communication operation based on a resource management at the network side.

The mentioned above is only preferred embodiments of the invention but not limitation for the invention, various modification and variations can be devised by those skilled in the art, and it should be understood that any modification, equivalent and improvement devised without departing from the spirit and scope of the invention belong to the protection scope of the invention.

What is claimed is:

1. A group resource allocation method, comprising:
   grouping user-side equipments by a user resource management device according to a service type or a Modulation and Coding Scheme (MCS) of the user-side equipments; and
   performing an initialization description or an update and maintenance description for the grouped group or groups via a group message and describing resource allocation information of the user-side equipments in each group via the group message, by a user resource management device, to realize a group resource allocation;
   wherein the group message comprises control information of more than one groups; the control information indicates the number of groups that are being initialized and the number of groups that are being maintained, and describes a group initialization message of the groups that are being initialized and a group maintenance message of the groups that are being maintained; the group initialization message and the group maintenance message correspond to a same message type index and are both sent in a unicast service control channel;

wherein the step of performing an initialization description for each group by a user resource management device according to a group message comprises initializing each group via the group initialization message; the group initialization message describes the basic information of each group and the resource allocation information of the user-side equipments in each group; the basic information includes: a group identifier, a MCS of a group, the number of the user-side equipments in a group, and a user terminal identifiers of the user-side equipments in a group.

2. The method according to claim 1, wherein the step of grouping user-side equipments by a user resource management device according to a service type of the user-side equipments comprises dividing the user-side equipments of the same service type into one group by the user resource management device, wherein one or more MCSs are involved in the group; and the step of grouping user-side equipments by a user resource management device according to an MCS of the user-side equipments comprises dividing the user-side equipments using the same MCS into one group by the user resource management device, wherein one or more service types are involved in the group.

3. The method according to claim 2, wherein the resource allocation information comprises at least one of:

a location of a group resource, a size of a group resource, a user terminal bitmap, a primary resource bitmap, a secondary resource indication enable, a secondary resource indication bitmap, and an MCS bitmap.

4. The method according to claim 3, wherein the resource allocation information includes the MCS bitmap when there are multiple MCSs in a group; and the resource allocation information includes no MCS bitmap when there is only one MCS in a group.

5. The method according to claim 3, wherein the primary resource bitmap indicates the user resource used in the first case with predetermined bits; the first case comprises: a case where n or more resource units are occupied by a data packet of a predetermined service in a silent period, and a case where description overhead of user resources, when a user-side equipment in a silent period is indicated by the secondary resource indication bitmap and a user-side equipment in a voice-activated period is indicated by the primary resource bitmap, is greater than that of the user resources when all user-side equipments are indicated by the primary resource bitmap.

6. The method according to claim 3, wherein the secondary resource indication enable indicates and enables the secondary resource indication bitmap with one bit in the second case, and describes the secondary resource indication bitmap; the second case comprises: a case where the description overhead of user resources, when a user-side equipment in a silent period is indicated by the secondary resource indication bitmap and a user-side equipment in a voice-activated period is indicated by the primary resource bitmap, is smaller than that of the user resources when all user-side equipments are indicated by the primary resource bitmap, and the user-side equipments in the silent period only occupy one resource unit.

7. The method according to claim 6, wherein the primary resource bitmap describes the resources of corresponding user-side equipments when the secondary resource indication enable is disenabled.

8. The method according to claim 3, wherein

MCSs of a group are a set of multiple successive or discrete MCSs, and a 1-bit MCS succession indicator is used for indicating whether or not the MCSs of a group are successive;

when the MCS succession indicator indicates that the MCSs of a group are successive, the group message describes a starting MCS and the number of the successive MCSs; or the group message describes a starting and a terminating MCSs; and when the MCS succession indicator indicates that the MCSs of a group are discrete, the group message describes the number of the MCSs of the group and each MCS of the group.

9. The method according to claim 1, wherein the group identifier indicates group index to which the group initialization message belongs; and the user terminal identifiers are described by the user resource management device according to the ascending order of the location indexes of the corresponding bits of the user-side equipments in a user terminal bitmap.

10. The method according to claim 1, wherein the user resource management device is a base station, and the user-side equipment is a user terminal.

11. The method according to claim 1, wherein

MCSs of a group are a set of multiple successive or discrete MCSs, and a 1-bit MCS succession indicator is used for indicating whether or not the MCSs of a group are successive;

when the MCS succession indicator indicates that the MCSs of a group are successive, the group message describes a starting MCS and the number of the successive MCSs; or the group message describes a starting and a terminating MCSs; and when the MCS succession indicator indicates that the MCSs of a group are discrete, the group message describes the number of the MCSs of the group and each MCS of the group.

* * * * *